UNITED STATES PATENT OFFICE.

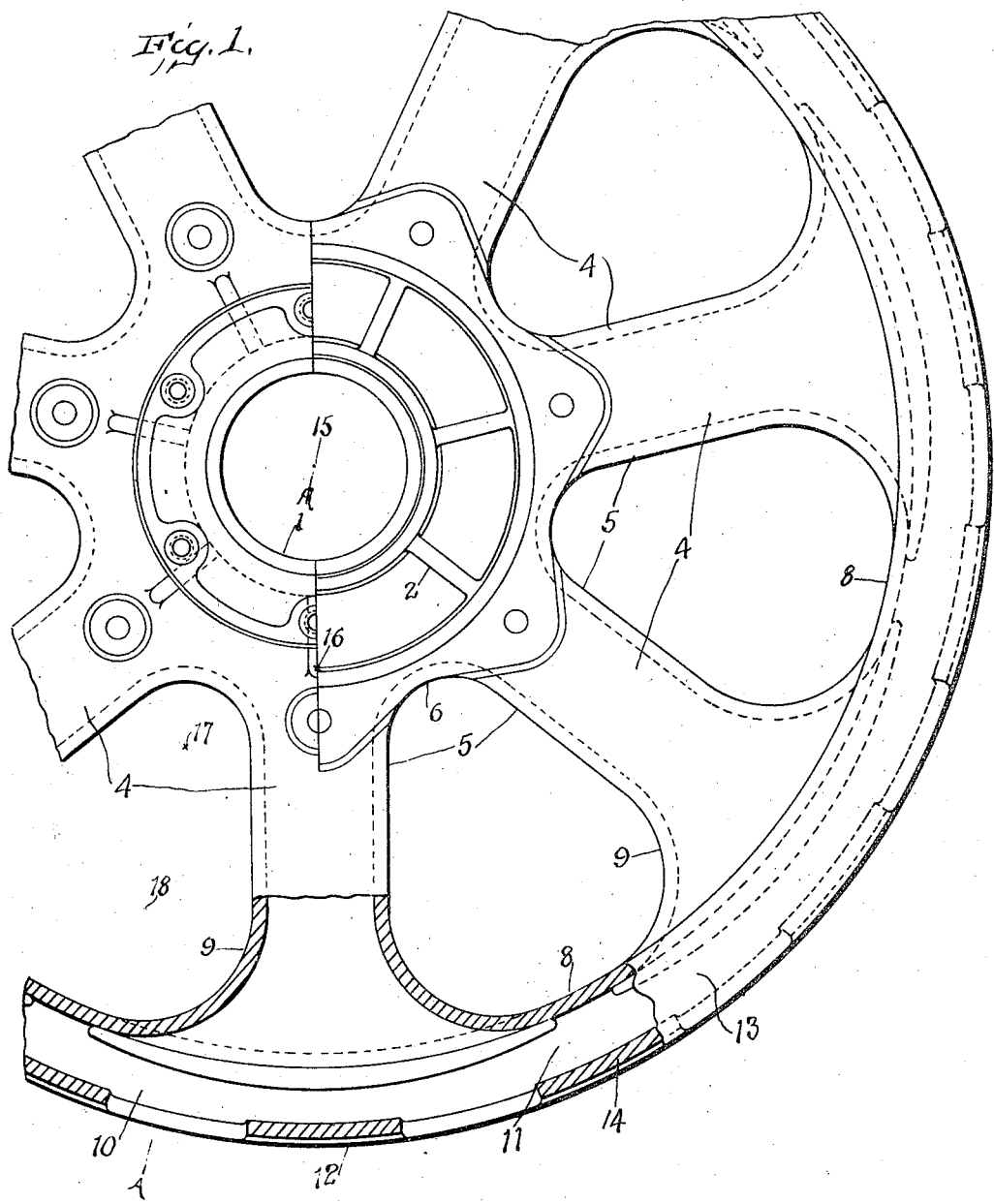

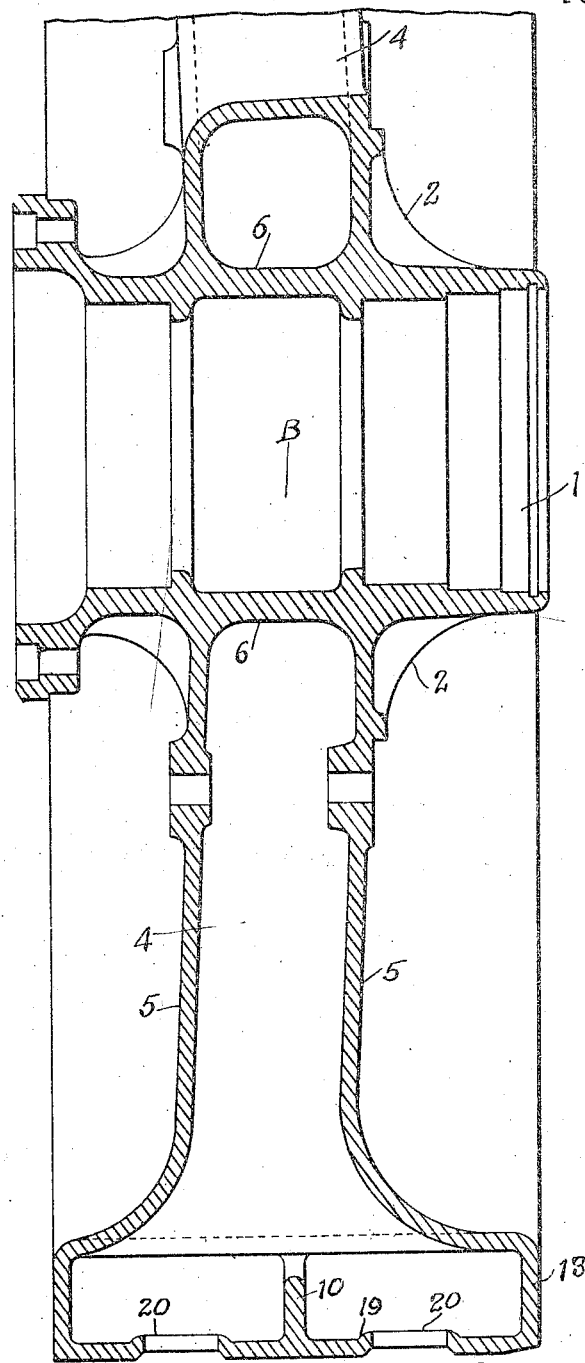

ALFONSO MARIA LEONI, OF DAYTON, OHIO, ASSIGNOR TO THE DAYTON STEEL FOUNDRY COMPANY, OF DAYTON, OHIO, A CORPORATION OF OHIO.

WHEEL.

1,266,603.      Specification of Letters Patent.      Patented May 21, 1918.

Application filed March 31, 1917. Serial No. 158,793.

*To all whom it may concern:*

Be it known that I, ALFONSO MARIA LEONI, a subject of the King of Italy, residing at Dayton, in the county of Montgomery and State of Ohio, have invented certain new and useful Improvements in Wheels, of which the following is a specification, reference being had therein to the accompanying drawing.

My invention relates to wheels, particularly steel wheels.

It is the object of my invention to provide a steel wheel of hollow hub spoke and rim construction to secure the maximum strength combined with the greatest possible resiliency. Strength and resiliency are the two essentials in steel wheels, particularly those subjected to great strains as are the wheels made of steel of this construction.

This invention is an improvement on the construction illustrated in the patent to George W. Walther No. 1,120,256, Dec. 8th, 1914.

Heretofore braces have been inserted in the outer open ends of the spokes for the purpose of supporting the outer wall of the wheel rim. The inner ends of these braces rested on the outwardly flaring curve of the spoke at its outer end. The weight of the vehicle and the wheel rests, through the support, upon the arch of the spoke at this point of its curvature. As a consequence all the weight and strain is placed upon the point where the greatest resiliency is needed, namely, the curving flare of the outer spoke end.

Each pair of spokes in my construction form an arch at their outer end and an arch at their inner end. The union of the flaring ends of the spokes at the outer end in the form of an arch forms the inner wall of the rim of the wheel. At the crown or key of each of these outer spoke arches between the spokes on the periphery of the inner wall of the rim is a point or area where the least, if any, resiliency is required and secured. It is also the locality from which the crushing strain of the vehicle can be distributed most judiciously to all points of the wheel adjacent thereto and to the axle if any strain proceeds that far.

Furthermore, I find that the weakest point of the rim is that opposite the open end of the spoke and it is that portion of the rim, particularly the outer periphery, which needs support.

It is my object, then, to provide this support for the weakest point of the rim by providing an arch spanning the open end of the spoke, supporting the rim on its crown at its weakest point, and resting the abutments of the arch upon the strongest points, namely, the crowns of the outer spoke arches. This obviates the immense disadvantage of having any portion of the supporting rib or arch resting upon the flaring outer ends of the spoke ends which should be left free to provide the resiliency for the wheel. I rest the abutments of my arches upon the portions of the outer spoke arches where this resiliency is not provided.

My intention and object is to provide a support for the weight and a resistance to the strain through a series of arches supporting the weakest portions at the points of greatest strain and impact with the abutments of the arches resting on the points of least resiliency and greatest strength. Thus, I provide a wheel of maximum strength and maximum resiliency.

It is another and very important object of my construction to provide arches of different curvatures. Thus, each arch will have a different rate of vibration of its metal composing it. In this wheel, there will be a series of non-synchronous elements through which any shock must pass. As a consequence, the shock will be destroyed or materially dampened by passing through these non-synchronous elements, which will be out of tune with the vibrations of the shock and thereby effectually destroy it according to well known physical laws. My construction is a novel one in the art of wheel construction to effectually dampen shock. This is an additional reason why it is important to have the resilient portions of the wheel unrestricted for their proper functioning.

There is another purpose in my construction in providing a bridge over the open end of the outer end of the spoke transverse to the arch which spans that opening. This bridge joins the walls of the rim to one another and forms a portion of the outer periphery of the wheel. A similar bridge extends as a portion of the outer periphery from wall to wall opposite the crown of the outer spoke arches. Between these two bridges and divided by the arch spanning the outer end of the spoke are openings with inwardly formed ribs or flanges. These openings are provided for the purpose of attaching a tire. The inwardly formed ribs both strengthen the construction and also provide a surface which will not disturb by jolt or jar the finishing tool which is used to machine the outer periphery of the wheel. When the tool comes opposite the openings, it has been found in other constructions there will be a jolt or jar which will be injurious to the tool and to the machine.

I have shown as a preferred embodiment of my invention a wheel with an uneven number of spokes. This is not essential, but it is of advantage because, by reason of such a location, no arch is directly opposite another arch. As a consequence, the shocks and strains are not carried by the axle in a straight line but are deflected and carried through the relatively flexible and resilient portions of the wheel.

In the accompanying drawings, Figure 1 is a side elevation of a wheel embodying my invention, partially in section on the line B B; and Fig. 2 is a vertical transverse section of the wheel on lines A A.

1 is a hub, 2 are external braces on said hub, 4 is a hollow spoke of which the walls 5, 5 meet in an inner spoke arch 6 and an outer spoke arch 9 with a crown 8. 10 is a supplementary arch with its abutments 11 resting on the crowns 8. These abutments must be located so that the abutments will not intrude upon the curvature of the arch and thereby interfere with its resiliency. 12 is a bridge spanning the open end of the spoke and joining the walls 13 of the rim together and connecting said walls, a supplementary arch 10 forming in cross section a T-shaped structure. 14 is a similar secondary bridge joining the walls and the abutments of the supplementary arches together opposite the crown of the outer spoke end arch.

In one of the preferred forms of construction which is illustrated the curvature of the outer periphery of the wheel is determined by a point moving in a circular path with 15 as a center. The inner curvature of the supplementary arch 10 is described by a point moving with 16 as a center. The inner spoke end arch has its inner periphery described about a point moving with 17 as a center and the outer spoke end arch has its curvature described with 18 as a center.

The location of these points is not essential save that it is of value to have the arches of a different curvature and therefore the material forming them will be of a different rate of vibration one from the other, which will effectually take up the strain and dampen shock, as well as prevent undue vibration at any one point leading to crystallization and destruction of the wheel.

Referring to Fig. 2, 19 indicates the inwardly bent edges of the openings 20 between the T-shaped structure formed by 10 and 12 and the walls 13.

While I have shown and described one embodiment of my invention it will be understood that the same has been chosen for the purposes of illustration only, and that I do not desire to be limited to the details of construction shown and described, for obvious modifications will occur to a person skilled in the art.

Having thus fully described my invention, what I claim as new and desire to secure by Letters Patent, is:—

1. In a wheel, a hollow hub, an uneven number of hollow spokes with flaring outer ends forming spoke arches where they adjoin each other, a hollow rim, the inner wall of which is formed by said spoke arches, an outer wall of said rim supported by supplementary arches bridging the outer ends of the spokes with their abutments resting on the crowns of the spoke arches.

2. In a wheel, an uneven number of hollow spokes with flaring outer ends forming spoke arches where they adjoin each other, a hollow rim, the inner wall of which is formed by said spoke arches, an outer wall of said rim supported by supplementary arches bridging the outer ends of the spokes with their abutments resting on the crowns of the spoke arches, side walls of the rim and a bridge across the end of each spoke joining said side walls and each of said supplementary arches to the side walls, said bridge thereby becoming a portion of the outer periphery of the rim.

3. In a wheel, an uneven number of hollow spokes with flaring outer ends forming spoke arches where they adjoin each other, a hollow rim, the inner wall of which is formed by said spoke arches, an outer wall of said rim supported by supplementary arches bridging the outer ends of the spokes with their abutments resting on the crowns of the spoke arches, side walls of the rim and a bridge across the end of each spoke joining said side walls and each of said supplementary arches to the side walls, said bridge thereby becoming a portion of the outer periphery of the rim, a second transverse bridge forming another portion of the outer periphery of the rim located over the crown of the spoke arch at which point said second bridge joins the wall of the rim together.

4. In a wheel, hollow spokes with flaring outer ends forming spoke arches where they adjoin each other, a hollow rim, the inner wall of which is formed by said spoke arches, an outer wall of said rim supported by supplementary arches bridging the outer ends of the spokes with their abutments resting on the crowns of the spoke arches, side walls of the rim, a bridge across the end of each spoke joining said side walls and each of said supplementary arches to the side walls, said bridge thereby becoming a portion of the outer periphery of the rim, a second transverse bridge forming another portion of the outer periphery of the rim located over the crown of each spoke arch, at which point said second bridge joins the wall of the rim together, said rim having a pair of openings between each of said bridges divided by the vertical wall of each supplementary arch.

5. In a wheel, hollow spokes with flaring outer ends forming spoke arches where they adjoin each other, a hollow rim, the inner wall of which is formed by said spoke arches, an outer wall of said rim supported by supplementary arches bridging the outer ends of the spokes with their abutments resting on the crowns of the spoke arches, side walls of the rim, a bridge across the end of each spoke joining said side walls and each of said supplementary arches to the side walls, said bridge thereby becoming a portion of the outer periphery of the rim, a second transverse bridge forming another portion of the outer periphery of the rim located over the crown of each spoke arch, at which point said second bridge joins the wall of the rim together, said rim having a pair of openings between each of said bridges divided by the vertical wall of each supplementary arch, said openings having inwardly formed marginal ribs on the edges of said openings.

6. In a wheel, hollow spokes forming by their flaring outer ends spoke arches constituting the inner wall of a rim, side walls of said rim, supplementary arches bridging the open ends of the spokes with their abutments resting on the crown of the spoke arches, said supplementary arches with the outer wall of the rim being substantially T-shaped in cross section, bridges over the crown of the spoke arches binding the walls together, said rim having openings on each side of said T-shaped arches.

7. In a wheel, hollow spokes forming by their flaring outer ends spoke arches constituting the inner wall of a rim, side walls of said rim, supplementary arches bridging the open ends of the spokes with their abutments resting on the crown of the spoke arches, said supplementary arches with the outer wall of the rim being substantially T-shaped in cross section, bridges over the crown of the spoke arches binding the walls together, transverse bridges across the mouths of the open spoke ends joining said supplementary arches and walls of said rim to form a part of the outer periphery of the rim, and openings on each side of said T-shaped arch.

8. In a wheel, hollow spokes forming by their flaring outer ends spoke arches constituting the inner wall of a rim, side walls of said rim, supplementary arches bridging the open ends of the spokes with their abutments resting on the crown of the spoke arches, said supplementary arches with the outer wall of the rim being substantially T-shaped in cross section, bridges over the crown of the spoke arches binding the walls together, inward extensions of the outer periphery of the rim from the outer walls toward the T-shaped arch, a transverse bridge over the mouths of the spokes binding the walls of the rim to the T-shaped arch, said rim having openings between the bridge and the T-arch.

9. In a wheel with hollow hub, spokes and rim, a supplementary arch bridging the outer open end of each spoke with its abutments resting on the crown of the arches formed by the union of the outwardly flaring ends of adjacent spokes, arches formed at the inner ends of each spoke by the union of their flaring ends, said arches being of different radii of curvature, whereby shock traversing such wheel would be dampened by passing through non-synchronous elements of different rates of vibration.

10. In a wheel, an uneven number of hollow spokes, a hollow hub and a rim, said spokes forming on their inner ends arches at their point of union and at their outer ends arches at their point of union in broadly sweeping curves, supplementary arches bridging the outer ends of said hollow spokes with the abutments of the supplementary arches resting on the crowns of the outer spoke arches, each of said series of arches from rim to hub being of a different curvature and each spoke being opposite the inner and outer spoke arch on the opposite side of the wheel, whereby shock imparted to the periphery of the wheel will travel in an indirect line through a plurality of elements of different curvature and non-synchronous vibrations.

In testimony whereof I affix my signature.

ALFONSO MARIA LEONI.